United States Patent
Chu et al.

(10) Patent No.: US 10,628,486 B2
(45) Date of Patent: Apr. 21, 2020

(54) PARTITIONING VIDEOS

(71) Applicant: Google LLC, Mountain View, CA (US)

(72) Inventors: Hang Chu, Toronto (CA); Michael Nechyba, Pittsburgh, PA (US); Andrew C. Gallagher, Mountain View, CA (US); Utsav Prabhu, Pittsburgh, PA (US)

(73) Assignee: Google LLC, Mountain View, CA (US)

( * ) Notice: Subject to any disclaimer, the term of this patent is extended or adjusted under 35 U.S.C. 154(b) by 214 days.

(21) Appl. No.: 15/813,978

(22) Filed: Nov. 15, 2017

(65) Prior Publication Data
US 2019/0147105 A1 May 16, 2019

(51) Int. Cl.
| | |
|---|---|
| *G06F 16/71* | (2019.01) |
| *G06N 3/08* | (2006.01) |
| *G06F 16/783* | (2019.01) |
| *G06F 16/78* | (2019.01) |
| *G06N 3/04* | (2006.01) |
| *G06K 9/00* | (2006.01) |
| *G06K 9/62* | (2006.01) |
| *G11B 27/02* | (2006.01) |

(Continued)

(52) U.S. Cl.
CPC ............ *G06F 16/71* (2019.01); *G06F 16/785* (2019.01); *G06F 16/7834* (2019.01); *G06F 16/7837* (2019.01); *G06K 9/00765* (2013.01); *G06K 9/6274* (2013.01); *G06N 3/0445* (2013.01); *G06N 3/0454* (2013.01); *G06N 3/084* (2013.01); *G11B 27/02* (2013.01); *H04N 19/142* (2014.11); *H04N 21/44* (2013.01)

(58) Field of Classification Search
None
See application file for complete search history.

(56) References Cited

U.S. PATENT DOCUMENTS

| | | | |
|---|---|---|---|
| 5,805,733 A | 9/1998 | Wang et al. | |
| 5,911,008 A * | 6/1999 | Niikura ............... | G06K 9/00711 |
| | | | 348/E5.067 |

(Continued)

FOREIGN PATENT DOCUMENTS

EP 2408190 1/2012

OTHER PUBLICATIONS

Hassanien et al. "Large-scale, Fast and Accurate Shot Boundary Detection through Spatio-temporal Convolutional Neural Networks," arXiv 1705.03281v2, Jul. 27, 2017, 20 pages.

(Continued)

*Primary Examiner* — Gelek W Topgyal
(74) *Attorney, Agent, or Firm* — Fish & Richardson P.C.

(57) ABSTRACT

Methods, systems, and apparatus, including computer programs encoded on a computer storage medium, for partitioning videos. In one aspect, a method includes obtaining a partition of a video into one or more shots. Features are generated for each shot, including visual features and audio features. The generated features for each shot are provided as input to a partitioning neural network that is configured to process the generated features to generate a partitioning neural network output. The partition of the video into one or more chapters is determined based on the partitioning neural network output, where a chapter is a sequence of consecutive shots that are determined to be taken at one or more locations that are semantically related.

18 Claims, 5 Drawing Sheets

(51) Int. Cl.
*H04N 19/142* (2014.01)
*H04N 21/44* (2011.01)

(56) References Cited

U.S. PATENT DOCUMENTS

| | | | | |
|---|---|---|---|---|
| 8,063,295 | B2* | 11/2011 | Bonet | G06Q 30/02 |
| | | | | 84/608 |
| 9,436,876 | B1 | 9/2016 | Carlson | |
| 2005/0125223 | A1* | 6/2005 | Divakaran | G06K 9/00711 |
| | | | | 704/223 |
| 2009/0080868 | A1* | 3/2009 | Murabayashi | H04N 21/4147 |
| | | | | 386/278 |
| 2012/0143808 | A1* | 6/2012 | Karins | G06N 7/005 |
| | | | | 706/46 |
| 2013/0251340 | A1* | 9/2013 | Jiang | G06K 9/00718 |
| | | | | 386/244 |
| 2015/0050006 | A1 | 2/2015 | Sipe | |
| 2015/0161147 | A1 | 6/2015 | Zhao et al. | |
| 2015/0243325 | A1* | 8/2015 | Pacurariu | G11B 27/034 |
| | | | | 386/227 |
| 2015/0296228 | A1* | 10/2015 | Chen | G06F 16/78 |
| | | | | 725/34 |
| 2015/0363635 | A1* | 12/2015 | Suri | G06K 9/00268 |
| | | | | 386/241 |
| 2016/0014482 | A1* | 1/2016 | Chen | G11B 27/031 |
| | | | | 386/241 |
| 2016/0203367 | A1* | 7/2016 | Oami | G06K 9/00711 |
| | | | | 382/103 |
| 2016/0267914 | A1* | 9/2016 | Hu | G10L 19/008 |
| 2016/0337776 | A1* | 11/2016 | Breebaart | F24C 15/2028 |
| 2017/0025119 | A1* | 1/2017 | Song | G10L 15/04 |
| 2017/0329769 | A1* | 11/2017 | Berg | G06F 16/41 |
| 2018/0114071 | A1* | 4/2018 | Wang | G06K 9/00744 |
| 2018/0121732 | A1* | 5/2018 | Kim | G06N 3/0454 |
| 2018/0150905 | A1* | 5/2018 | Lee | G06F 17/2785 |
| 2019/0027188 | A1* | 1/2019 | Akolkar | G11B 27/031 |

OTHER PUBLICATIONS

Lee et al. "Video scene change detection using neural network: Improved ART2," Expert Systems with Applications, vol. 31, No. 1, Jul. 1, 2006, 13 pages.

PCT International Search Report and Written Opinion issued in International Application No. PCT/US2018/058388, dated Feb. 12, 2019, 17 pages.

Wu et al. "Multi-Stream Multi-Class Fusion of Deep Networks for Video Classification," Proceedings of the 2016 ACM on Multimedia Conference, Oct. 15, 2016, 10 pages.

Cour et al. "Movie/script: Alignment and parsing of video and text transcription," Proceedings of the European Conference on Computer Vision, Oct. 2008, 16 pages.

Gallagher et al. "Clothing cosegmentation for recognizing people," IEEE Conference on Computer Vision and Pattern Recognition, Jun. 2008, 8 pages.

Hershey et al. "CNN Architectures for Large-Scale Audio Classification," arXiv 1609.09430v2, Jan. 10, 2017, 5 pages.

Ishikawa. "Higher-order clique reduction in binary graph cut," IEEE Conference on Computer Vision and Pattern Recognition, Jun. 2009, 8 pages.

Iyyer et al. "The amazing mysterious of the gutter: Drawing inferences between panels in comic book narratives," arXiv 1611.05118v2, May 7, 2017, 10 pages.

Jansen et al. "Large-Scale Audio Event Discovery in One Million YouTube Videos," Proceedings of ICASSP 2017, 5 pages.

Kolmogorov et al. "What energy functions can be minimized via graph cuts?" IEEE transaction on pattern analysis and machine intelligence 26(2), Feb. 2004, 18 pages.

Krizhevsky et al. "ImageNet Classification with Deep Convolutional Neural Networks," Advances in Neural Information Processing Systems, 2012, 9 pages.

Liu et al. "SIFT Flow: Dense Correspondence across Scenes and its Applications," IEEE Transactions on Pattern Analysis and Machine Intelligence, Vo. 33(5) 2011, 17 pages.

Mas et al. "Video Shot Boundary Detection based on Color Histogram," Notebook Papers, TRECVID, NIST, Oct. 2003, 11 pages.

Rother et al. "Minimizing sparse higher order energy function of discrete variables," IEEE Conference on Computer Vision and Pattern Recognition, Jun. 20, 2009, 8 pages.

Schroff et al. "FaceNet: A Unified Embedding for Face Recognition and Clustering," IEEE Conference on Comuter Vision and Pattern Recognition, 2015, 9 pages.

Shotton et al. "TextonBoost: Joint appearance, shape and context modeling for multi-class object recognition and segmentation," European conference on computer vision, May 2006, 14 pages.

Szegedy et al. "Going Deeper with Convolutions," IEEE Conference on Computer Vision and Pattern Recognition, 2015, 9 pages.

Tibshirani et al. "Estimating the Number Of Clusters in a Dataset via the Gap Statistic, Statistical methodology," Journal of the Royal Statistical Society: Series B (Statistical Methodology) 63.2), Jan. 2001, 13 pages.

Vinyals et al. "Show and Tell: Lessons Learned from the 2015 MSCOCO Image Captioning challenge," IEEE Transaction on Pattern Analysis and Machine Intelligence, 39.4, Apr. 2017, 12 pages.

Xiang et al. "Modeling Changing Dependency Structure in Multivariate Time Series," Proceedings of the 24$^{th}$ International Conference on Machine Learning, ACM, Jun. 20, 2007, 8 pages.

Zhai et al. "Video scene segmentation using markov chain monte carlo," IEEE Trans. Multimedia 8.4 , Aug. 2006, 12 pages.

* cited by examiner

PARTITIONING VIDEOS

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a method implemented as computer programs on one or more computers in one or more locations that performs video partitioning tasks.

According to a first aspect there is provided a method for partitioning videos, the method comprising: obtaining a partition of the video into one or more shots, wherein a shot is sequence of consecutive frames with a smoothly temporally varying viewpoint; generating features for each shot, including, for a particular shot: generating visual features for the particular shot, including providing video data of the particular shot as input to a visual feature neural network that processes the video data to generate one or more visual feature outputs; generating audio features for the particular shot, including providing audio data of the particular shot as input to an audio feature neural network that processes the audio data to generate one or more audio feature outputs; providing the generated features for each shot as input to a partitioning neural network that is configured to process the generated features to generate a partitioning neural network output; determining the partition of the video into one or more chapters based on the partitioning neural network output, wherein each chapter is a sequence of consecutive shots that are determined to be taken at one or more locations that are semantically related.

In some implementations, determining a partition of the video into one or more chapters comprises: determining a partition of the video into one or more scenes, wherein each scene is a sequence of consecutive shots that are determined to be taken at a particular location depicted in the video and each chapter is a sequence of consecutive scenes that are determined to be semantically related.

In some implementations, at least one chapter has at least two scenes where the respective shots of the two scenes are each taken at different locations.

In some implementations, the partition of the video into one or more shots is provided.

In some implementations, the partition of the video into one or more shots is determined based on an automated frame analysis process.

In some implementations, generating features for each shot includes: generated a fixed size feature representation for each shot, independent of the number of frames in the shot.

In some implementations, generating a fixed-size feature representation for each shot comprises: pooling features generated for each frame of each shot.

In some implementations, the visual feature neural network is configured to receive an image; providing video data of the particular shot as input to the visual feature neural network comprises: providing each frame of the particular shot as input to the visual feature neural network to generate one or more visual feature outputs for each frame.

In some implementations, the one or more visual feature outputs for each frame include one or more intermediate outputs of the visual feature neural network.

In some implementations, the one or more audio feature outputs include one or more intermediate outputs of the audio feature neural network.

In some implementations, the one or more visual feature outputs for each frame include: a vector of probabilities, each probability indicating a likelihood that the frame depicts a particular type of object.

In some implementations, the one or more audio feature outputs include: a vector of probabilities, each probability indicating a likelihood that the audio data depicts a particular type of sound.

In some implementations, the partitioning neural network is a recurrent neural network.

In some implementations, the recurrent neural network is a bidirectional recurrent neural network.

In some implementations, generating visual features for the particular shot includes one or more of: generating color features characterizing the distribution of color intensities of the frames in the particular shot; generating frame similarity features characterizing a similarity between different frames in the particular shot; generating identity features based at least in part on one or more of: identities of people depicted in the particular shot; spatial positions of identified people depicted in the particular shot within video frames of the particular shot.

In some implementations, the partitioning neural network output indicates, for each shot, a probability that the last frame of the shot is the last frame of a chapter.

In some implementations, providing the generated features for each shot as input to a partitioning neural network that is configured to process the generated features to generate a partitioning neural network output comprises: providing generated features for each shot of each shot window to the partitioning neural network, wherein a shot window is a sequence of a pre-determined number of shots, to generate a partitioning neural network output for each shot window; and determining the partition of the video into one or more chapters based on the partitioning neural network output comprises: combining the partitioning neural network output for each shot window.

According to a second aspect, there is provided one or more computer storage media storing instructions that when executed by one or more computers cause the one or more computers to perform the operations of the method for partitioning videos.

According to a third aspect, there is provided a system comprising one or more computers and one or more storage devices storing instructions that when executed by the one or more computers cause the one or more computers to perform the operations of the method for partitioning videos.

Particular embodiments of the subject matter described in this specification can be implemented so as to realize one or more of the following advantages. The video partitioning method as described in this specification can generate partitions of videos into scenes and chapters, unlike some conventional video partitioning methods which can only partition videos into shots. Therefore the partitions generated by the video partitioning method as described in this specification can be used in some applications for which partitions generated by conventional video partitioning methods would not apply, such as the automatic insertion of third-party content (e.g. advertisements) between scenes or chapters of videos, or smart fast-forwarding features (e.g., allowing viewers to easily jump between scenes and chapters).

The video partitioning method as described in this specification integrates both visual features and audio features to determine video partitions, unlike some conventional methods that rely only on visual features, and therefore can generate video partitions that are more accurate (relative to ground-truth training data) than video partitions generated by methods that use only visual features. This is because the signals derived from the audio can be indicative that content should not be partitioned according to a particular partitioning criterion that would otherwise result in a partition when evaluated on image content alone. This results in a technical improvement in the field of video processing.

The video partitioning method as described in this specification can incorporate a recurrent neural network (e.g., a bidirectional recurrent neural network). Therefore, the video partitioning method as described in this specification can generate predictions for whether the last frame of a given shot represents a scene or chapter boundary by integrating information from previous (and in some cases future) frames and shots, and thereby generate video partitions. Again, this results in a more accurate set of video partitions according to one or more partitioning criterion that would otherwise not be available when not using a recurrent neural network. This is also another technical improvement in the field of video processing.

Moreover, in some implementations, a video partitioning method as described in this specification provides fixed-size feature representations of the shots of a video to a machine learning model to generate a partition of the video, unlike conventional methods that process only feature representations of the frames of a video. By processing feature representations of shots rather than frames, the video partitioning method as described in this specification is more efficient (e.g., consumes fewer computational resources) than other methods that process only the feature representations of video frames. Furthermore, by generating fixed-size feature representations of the shots of videos, the video partitioning method as described in this specification can incorporate a machine learning model (e.g., a neural network) with a fixed structure that is not dependent on the video being partitioned. Therefore, the video partitioning method as described in this specification can be trained on and applied to a broader class of videos than would be possible if it did not generate fixed-size feature representations of the shots of videos. These advantages are also an improvement in the field of image and video processing.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The technology in this written description is related to a method for determining partitions of a video into scenes or chapters given a partition of the video into shots. In general, a shot is a sequence of consecutive frames with smoothly temporally varying viewpoint. A scene is a sequence of consecutive shots that are determined to be taken at a particular location depicted in the video. A chapter is a sequence of consecutive shots that are determined to be taken at one or more locations that are semantically related. For example, a shot may depict the face of a person engaged in a conversation, a scene may correspond to respective shots of the faces of two or more people engaged in the conversation, and a chapter may correspond to respective shots taken at one or more locations depicting events related to the conversation.

System and methods that utilize this technology generate features for each shot, including visual features and audio features, and provide the features generated for each shot as input to a partitioning neural network. The neural network determines a partition of the video into chapters or scenes based on the partitioning neural network output. In some implementations, the partitioning neural network may be a bidirectional recurrent neural network.

These features and other features are described in more detail below.

Figure 1A:
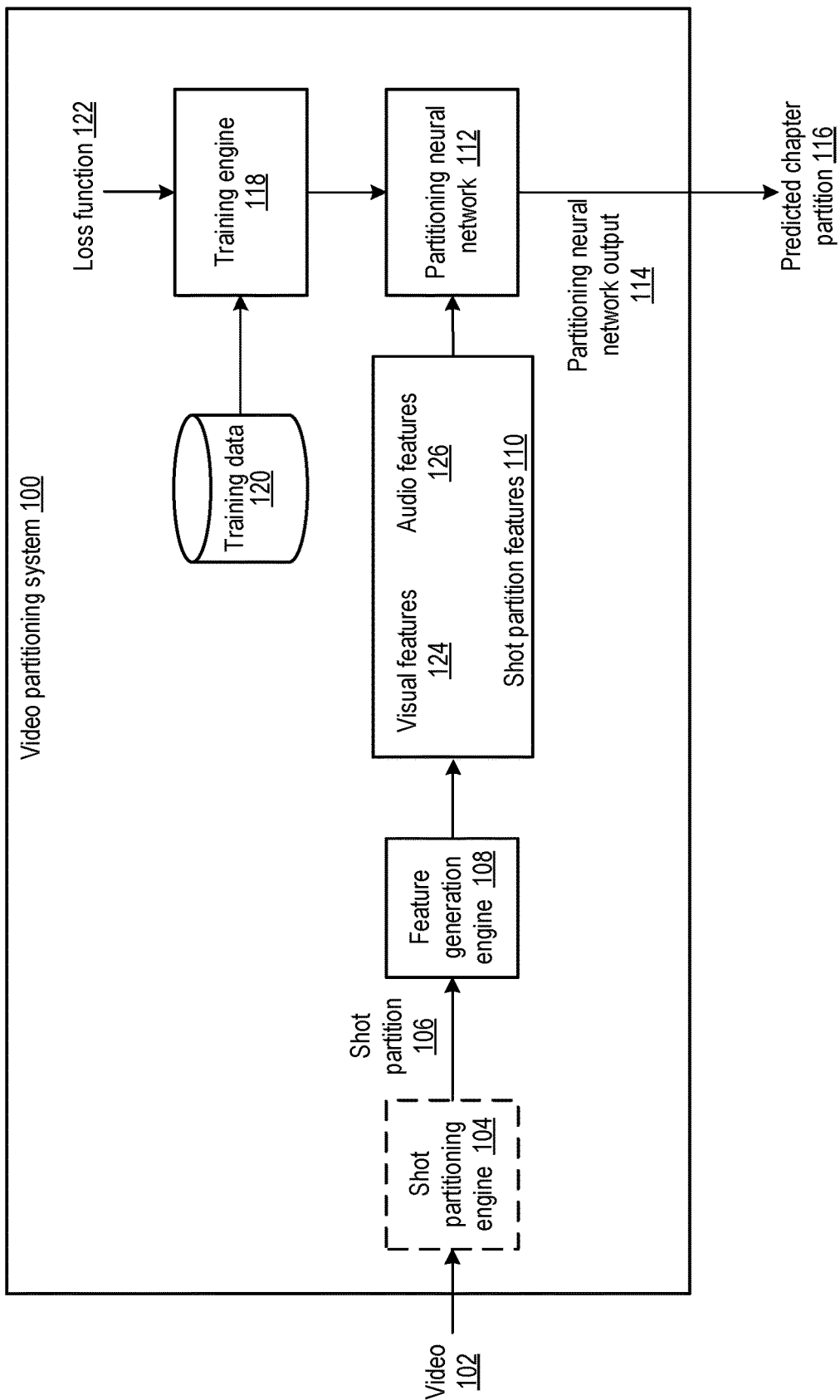
FIG. 1A is an illustration of an example video partitioning system.

FIG. 1A shows an example video partitioning system 100. The video partitioning system 100 is an example of a system implemented as computer programs on one or more computers in one or more locations in which the systems, components, and techniques described below are implemented.

The video partitioning system 100 generates a predicted partition of a video 102 into chapters 116. In some cases, the video 102 is acquired by video cameras. In some cases, the video 102 is a computer-generated video (e.g. an animated movie). In some cases, the video may be a combination of a video acquired by video cameras and a computer generated video (e.g. a movie with some computer-generated features or scenes). In general, the video 102 is accompanied by audio, which in this specification will be considered as a part of the video 102. The video 102 may include captions that are supplied by a script, generated by human transcription, or determined by automatic speech recognition.

The video 102 is composed of a sequence of consecutive shots. Again, a shot is a sequence of consecutive frames with a smoothly temporally varying viewpoint. A "smoothly temporally varying viewpoint" is detected when two consecutive frames do not have a number of visual changes that exceeds a threshold number of changes. For example, for videos acquired by video cameras, a shot is a sequence of consecutive frames that are determined to be taken from a particular camera. For example, a shot may depict the face of a person engaged in a conversation over a sequence of consecutive frames. By way of another example, for frames generated by an animation process, a shot is sequence of consecutive frames that have a smoothly temporally varying viewpoint.

The predicted chapter partition 116 generated by the system 100 refers to a partition of the video 102 into chapters, where a chapter is a sequence of consecutive shots that are determined to be taken at one or more locations and that are semantically related. For example, in a travel video, a chapter may correspond to respective shots taken at one or more locations in a particular city or in a particular country while a narrator describes the particular city or particular country.

In some implementations, the shot partitions for a video 102 can be pre-specified. In other implementations, the system 100 provides the video 102 to a shot partitioning engine 104 that is configured to receive a video as input and to process the video in accordance with the values of a set of shot partitioning engine parameters to generate as output a partition of the video 102 into shots 106. Any appropriate shot partitioning engine 104 can be used. One example of a shot partitioning engine can be a video processing engine that determines when the difference of visual characteristics of two consecutive frames is greater than a threshold. When such difference is detected, the engine determines a shot partition has occurred between the frames.

The system provides the shot partition 106 to a feature generation engine 108 that generates a fixed-size feature representation of each shot of the shot partition 106. The fixed-size feature representation of a shot includes visual features 124, extracted from the video frames corresponding to shot, and audio features 126, extracted from the audio accompanying the video frames of the shot. An example process for generating a fixed-size feature representation of a shot is described with reference to FIG. 3.

The system 100 provides the fixed-size feature representations of the shots of the shot partition 106 to a partitioning neural network 112, which is configured to receive the fixed-size feature representations of a pre-determined number of shots of a video as input, to process the input in accordance with the values of a set of partitioning neural network parameters, and to generate a partitioning neural network output 114. The system 100 determines the predicted chapter partition 116 based on the partitioning neural network output 114. An example process for determining a predicted partition of a video into chapters is described with reference to FIG. 2.

The partitioning neural network 112 is trained by a training engine 118 based on a set of training data 120. The training data 120 includes videos with annotations indicating chapter partitions. The training engine 118 provides videos from the training data 120 as input to the system 100, generates corresponding chapter partitions for the videos, and backpropagates gradients to adjust the values of the set of parameters of the partitioning neural network 112 based on a loss function 122. An example process for training a video partitioning system is described with reference to FIG. 4.

In some implementations, the system 100 generates a partition of the video 102 into scenes rather than chapters, where a scene is a sequence of consecutive shots that are determined to be taken at a particular location depicted in the video 102. For example, a scene may be a sequence of shots that cut between depicting the faces of multiple people engaged in a conversation. The system 100 can generate a scene partition of a video similarly to generating a chapter partition of a video, except the training data 120 would include videos with annotations indicating scene partitions rather than chapter partitions, and the training engine 118 would train the system 100 to generate scene partitions rather than chapter partitions.

Figure 1B:
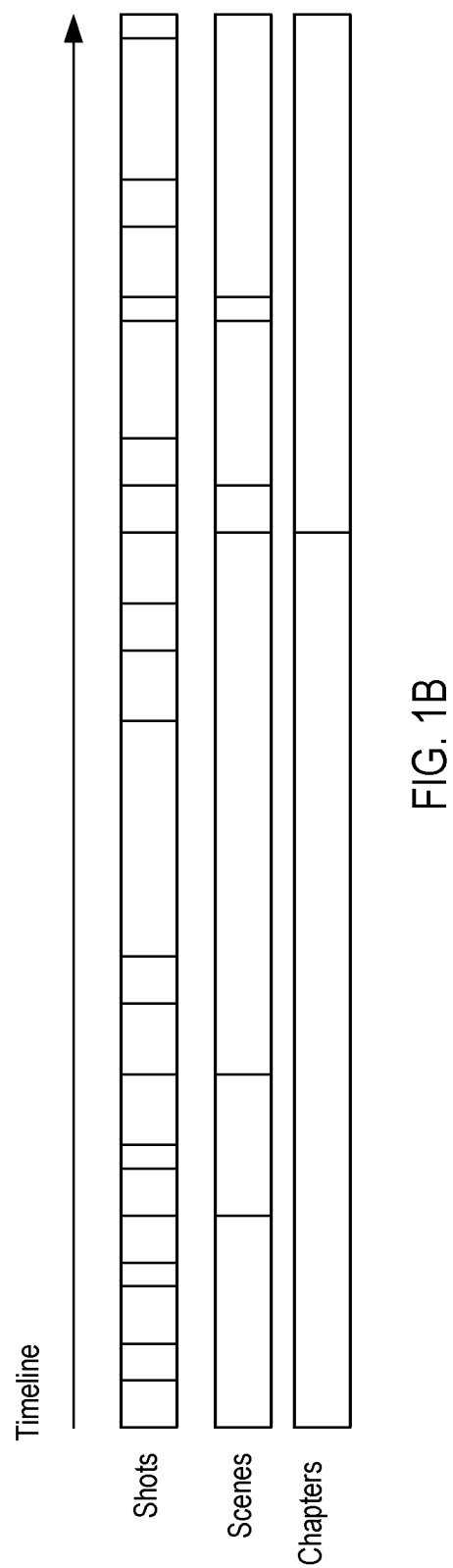
FIG. 1B is an illustration of example representations of partitions of a video.

In some other implementations, a chapter is considered to be a sequence of consecutive scenes that are determined to be semantically related, and the system 100 generates a partition of the video 102 into chapters by processing a scene partition rather than the shot partition 106. In some implementations, the system 100 generates a partition of a video into scenes in accordance with a first set of parameter values of the system 100, and generates a partition of the video into chapters (based on the partition of the video into scenes) in accordance with a second set of parameter values of the system 100. FIG. 1B depicts an example partition of a video into shots, scenes, and chapters. In some cases, at least one chapter has at least two scenes where the respective shots of the two scenes are each taken at different locations.

Figure 2:
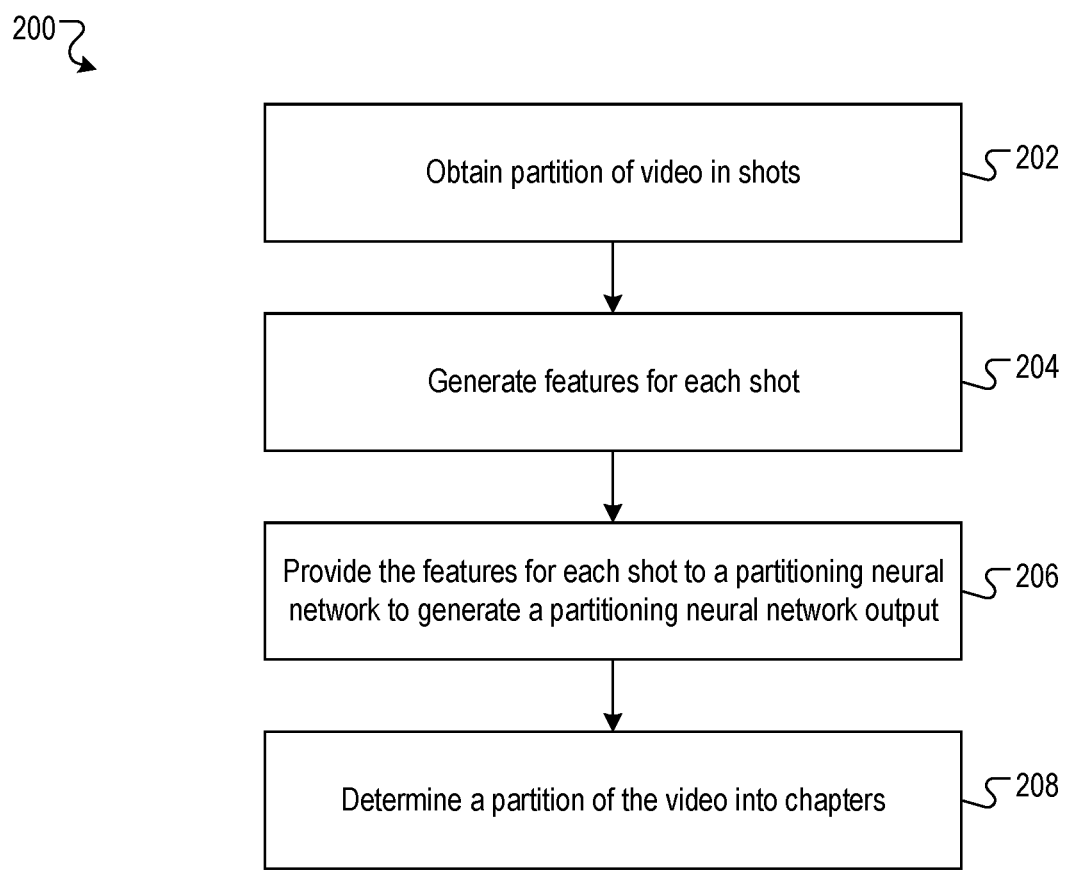
FIG. 2 is a flow diagram of an example process for determining a predicted partition of a video into chapters.

FIG. 2 is a flow diagram of an example process for determining a predicted partition of a video into chapters. For convenience, the process 200 will be described as being performed by a system of one or more computers located in one or more locations. For example, a video partitioning system, e.g., the video partitioning system 100 of FIG. 1A, appropriately programmed in accordance with this specification, can perform the process 200.

The system obtains a partition of a video into shots (202). In some implementations, the system provides the video to a shot partitioning engine that is configured to receive a video as input and to process the video in accordance with the values of a set of shot partitioning engine parameters to generate as output a partition of the video into shots. In some other implementations, the system is provided with the shot partitions (e.g., the shot partitions may be determined by manual annotation). In some implementations, the partition of the video into shots is represented as a binary vector with the same length as the number of frames of the video, and where a given entry has value 1 if the corresponding frame of the video is determined to be a shot boundary (i.e., the last frame of a shot), and 0 otherwise. In some other implementations, the partition of the video into shots is represented as a vector with the same length as the number of shots in the video, where a given entry has a value given by the frame index of a video frame determined to be a shot boundary.

The system, in some implementations, generates a fixed-size feature representation of each shot of the shot partition (204). An example process for generating a fixed-size feature representation of a shot is described with reference to FIG. 3.

The system 100 provides the fixed-size feature representations of the shots of the shot partition to a partitioning neural network, which is configured to receive the fixed-size feature representations of a pre-determined number of shots of a video as input, to process the input in accordance with the values of a set of partitioning neural network parameters, and to generate a partitioning neural network output (206). If the shot partition of the video has more shots than the pre-determined number of shots for which the partitioning neural network is configured to receive fixed-size feature representations as input, then the shots of the shot partition may be divided into a series of shot windows each consisting of a sequence of the pre-determined number of shots. The fixed-size feature representations of the shots of each shot window may be provided to the partitioning neural network as input, and a respective partitioning neural network output may be determined for each respective shot window. In some cases, the shot windows may be overlapping. For example, if the shot partition has 200 shots and the partitioning neural network is configured to receive the fixed-size feature representations of 100 shots at a time, then the shot windows may be given by: shot 0-shot 100, shot 50-shot 150, shot 100-shot 200. If the shot partition of the video has fewer shots than the pre-determined number of shots, then the shots of the shot partition may be sequentially repeated to generate a shot window with the pre-determined number of shots.

In some implementations, the partitioning neural network output for a shot window is a vector of binary variables, indicating a prediction for whether the last frame of each shot of the shot window is a chapter boundary (i.e., is the last frame of a chapter). In some implementations, the partitioning neural network output is a vector of probabilities (i.e., scalar values between 0 and 1) indicating the predicted probability that the last frame of each shot of the shot window is a chapter boundary.

In some implementations, the partitioning neural network is a recurrent neural network. In some implementations, the partitioning neural network is a bidirectional recurrent neural network. Other learning networks can also be used.

The system determines the predicted chapter partition for the video by integrating the partitioning neural network output for each shot window (208). In some implementations, the system may determine the prediction for whether the last frame of a given shot is a chapter boundary by combining (e.g., averaging) the predictions (e.g., binary predictions or probability predictions, as described above) for the last frame of the given shot from the partitioning neural network output for each shot window that includes the given shot. For example, if the shot windows are given by: shot 0-shot 100, shot 50-shot 150, and shot 100-shot 200, then the system may determine the prediction for whether the last frame of shot 100 is a chapter boundary by combining the predictions for the last frame of shot 100 from the partitioning neural network output for shot 0-shot 100 and shot 50-shot 150.

In some other implementations, the system may determine the prediction for whether the last frame of a given shot is a chapter boundary based on the prediction for the last frame of the given shot from the partitioning neural network output for a particular shot window that includes the given shot. In some cases, particularly when the partitioning neural network is a bidirectional recurrent neural network, the particular shot window may be selected as the shot window where the given shot is closest to the middle of the sequence of shots of the shot window. For example, if the shot windows are given by: shot 0-shot 100, shot 50-shot 150, and shot 100-shot 200, then the system may determine the prediction for whether the last frame of shot 100 is a chapter boundary as the prediction for the last frame of shot 100 from the partitioning neural network output for shot 50-shot 150.

Figure 3:
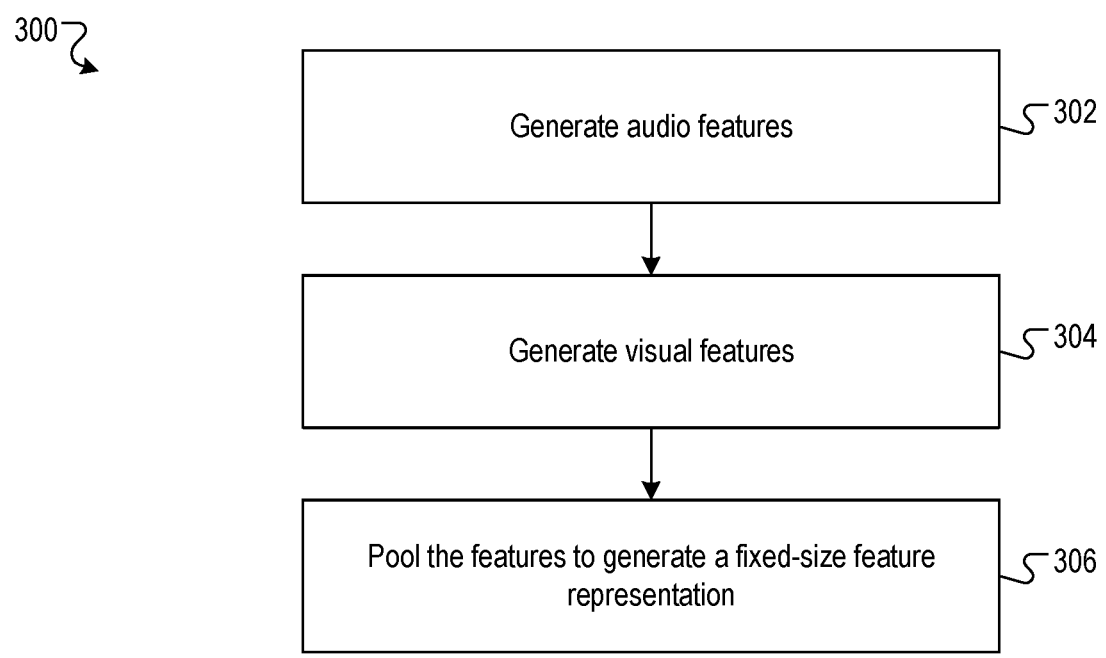
FIG. 3 is a flow diagram of an example process for generating a fixed-size feature representation of a shot.

FIG. 3 is a flow diagram of an example process for generating a fixed-size feature representation of a shot. For convenience, the process 300 will be described as being performed by a system of one or more computers located in one or more locations. For example, a video partitioning system, e.g., the video partitioning system 100 of FIG. 1A, appropriately programmed in accordance with this specification, can perform the process 300.

The system generates audio features for the shot (302). In some implementations, generating audio features includes providing audio data of the particular shot to an audio feature neural network that is configured to process audio data in accordance with a set of audio feature neural network parameters to generate one or more audio feature outputs. In some cases, the audio data is an audio signal accompanying the shot. In some other cases, the audio data is generated by pre-processing the audio signal, for example pre-processing the audio signal to generate a spectrogram representation. In some implementations, the audio feature neural network is trained to generate outputs including a vector of probabilities, each probability indicating the likelihood that the audio data depicts a particular type of sound (e.g. a gunshot). In some implementations, the audio features for the shot include one or more intermediate outputs of the audio feature neural network (i.e., one or more activations from one or more hidden layers of the audio feature neural network generated in response to processing input audio data).

The system generates visual features for the shot (304). In some implementations, generating visual features includes providing video data of the particular shot as input to a visual feature neural network that is configured to process video data in accordance with a set of visual feature neural network parameters to generate one or more visual feature outputs. In some implementations, the visual feature neural network is configured to receive an image, and generating visual features for the shot includes providing each video frame of the shot as input to the visual feature neural network, and generating one or more visual feature outputs for each video frame of the shot. In some implementations, the visual features for the shot include one or more intermediate outputs of the visual feature neural network (i.e., one or more activations from one or more hidden layers of the visual feature neural network generated in response to processing input video data). In some implementations, the visual feature neural network is trained to generate outputs including a vector of probabilities, each probability indicating a likelihood that a video frame provided as input to the visual feature neural network depicts a particular type of object (e.g., a cat).

In some implementations, generating visual features for the shot includes generating color features characterizing the distribution of color intensities of the video frames of the shot. For example, each video frame of the shot may be an RGB image. In this case, the system may generate a color feature by characterizing the distribution of intensities corresponding to each color channel of each video frame of the shot. In some implementations, the color features may include a histogram of color intensities of the video frames of the shot.

In some implementations, generating visual features for the shot includes generating frame similarity features characterizing a similarity between different video frames of the shot. For example, frame similarity features may be generated by determining a measure of frame similarity between each consecutive video frame of the shot. An appropriate system that determines frame similarity can be used.

In some implementations, generating visual features for the shot includes generating identity features based at least in part on identities of people depicted in the shot. In some implementations, the video is initially processed to detect and identify a particular set of people who are mostly frequently depicted in the video. The system may generate identity features for each video frame of the shot by, for example, applying detection and recognition methods to each video frame to generate probabilities that each person of the particular set of people appears in the frame. As another example, the system may generate identity features for each video frame of the shot by applying detection and recognition methods to each video frame to generate probabilities that each person of the particular set of people appears in each region of a set of regions of the video frame. The set of regions of the video frame can be defined by the regions of a grid. Any appropriate face detection system and recognition system can be used.

The system pools the features to generate a fixed-size feature representation for the shot (306). In particular, the fixed-size feature representation for the shot is independent of the number of video frames in the shot. Pooling a feature refers to combining the values of the feature that were determined for each video frame of the shot to determine a single value for the feature. In some implementations, pooling may be implemented by determining the pooled feature value as the average of the values of the feature determined for each video frame of the shot. In some implementations, pooling may be implemented by determining the pooled feature value as the maximum of the values of the feature determined for each video frame of the shot. In some implementations, different features may be pooled in accordance with different pooling operations. Some features may not require pooling. For example, audio features that indicate the probability that the audio data of the shot depicts a particular type of sound do not require pooling, since they are generated for the shot as a whole rather than for individual video frames of the shot. The fixed-size feature representation for the shot is determined by concatenating the pooled feature values and the feature values that do not require pooling.

Figure 4:
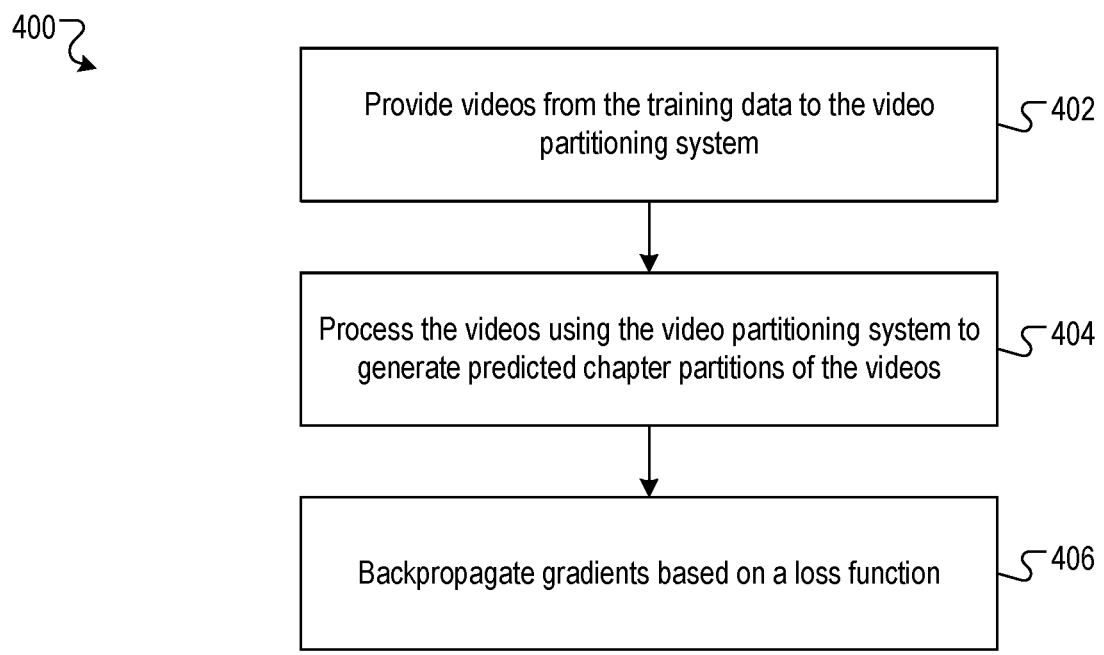
FIG. 4 is a flow diagram of an example process for training a video partitioning system.

FIG. 4 is a flow diagram of an example process for training a video partitioning system. For convenience, the process 400 will be described as being performed by a training engine including one or more computers located in one or more locations. For example, a training engine, e.g., the training engine 118 of FIG. 1A, appropriately programmed in accordance with this specification, can perform the process 400.

The engine provides videos from the training data to the video partitioning system (402). The training data includes videos with annotations indicating chapter partitions.

The system processes the videos to generate predicted chapter partitions of the videos (404). An example process for determining a predicted partition of a video into chapters is described with reference to FIG. 2.

The engine backpropagates gradients based on a loss function to adjust the values of the set of parameters of the partitioning neural network to cause the partitioning neural network to generate predicted chapter partitions that are more similar to the annotated chapter partitions of the videos of the training data. In some implementations, the loss function is a sum of cross-entropy loss functions, where each cross-entropy loss function corresponds to a shot of the shot window processed by the partitioning neural network. In particular, each cross-entropy loss function may measure a cross-entropy loss between the prediction of partitioning neural network for whether the last frame of a shot is a chapter boundary and the annotation of the training data indicating whether the last frame of the shot is a chapter boundary. In some other implementations, the loss function is a sum differences (e.g. squared-error differences) between a predicted number of shots after each particular shot and until a chapter boundary.

In implementations where the system is configured to generate a predicted partition of the video 102 into scenes rather than chapters, the training data includes videos with annotations indicating scene partitions, and the engine backpropagates gradients based on a loss function to cause the partitioning neural network to generate predicted scene partitions that are more similar to the annotated scene partitions of the videos of the training data.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for determining a partition of a video into one or more chapters, the method comprising:
obtaining a partition of the video into one or more shots, wherein a shot is sequence of consecutive frames with a smoothly temporally varying viewpoint;
generating an audio-visual feature representation of each shot, including, for each particular shot:
generating visual features for the particular shot, including providing video data of the particular shot as input to a visual feature neural network that processes the video data to generate one or more visual feature outputs;
generating audio features for the particular shot, including providing audio data of the particular shot as input to an audio feature neural network that processes the audio data to generate one or more audio feature outputs; and
generating the audio-visual feature representation of the particular shot based on the visual features for the particular shot and the audio features for the particular shot;
providing the audio-visual feature representations of the shots as input to a partitioning neural network that is configured to process the audio-visual feature representations of the shots to generate a partitioning neural network output that defines, for each shot, a probability that a last frame of the shot is a last frame of a chapter, wherein the probability corresponds to a numerical value between 0 and 1; and
determining the partition of the video into one or more chapters based on the partitioning neural network output, wherein each chapter is a sequence of consecutive shots that are determined to be taken at one or more locations that are semantically related.

2. The computer-implemented method of claim 1, wherein determining a partition of the video into one or more chapters comprises:
determining a partition of the video into one or more scenes, wherein each scene is a sequence of consecutive shots that are determined to be taken at a particular location depicted in the video and each chapter is a sequence of consecutive scenes that are determined to be semantically related.

3. The computer-implemented method of claim 2, wherein at least one chapter has at least two scenes where the respective shots of the two scenes are each taken at different locations.

4. The computer-implemented method of claim 1, wherein the partition of the video into one or more shots is provided.

5. The computer-implemented method of claim 1, wherein the partition of the video into one or more shots is determined based on an automated frame analysis process.

6. The computer-implemented method of claim 1, wherein generating features for each shot includes:
generated a fixed size feature representation for each shot, independent of the number of frames in the shot.

7. The computer-implemented method of claim 6, wherein generating a fixed-size feature representation for each shot comprises: pooling features generated for each frame of each shot.

8. The computer-implemented method of claim 1, wherein:
the visual feature neural network is configured to receive an image;
providing video data of the particular shot as input to the visual feature neural network comprises:
providing each frame of the particular shot as input to the visual feature neural network to generate one or more visual feature outputs for each frame.

9. The computer-implemented method of claim 8, wherein:
the one or more visual feature outputs for each frame include one or more intermediate outputs of the visual feature neural network.

10. The computer-implemented method of claim 8, wherein the one or more visual feature outputs for each frame include:
a vector of probabilities, each probability indicating a likelihood that the frame depicts a particular type of object.

11. The computer-implemented method of claim 1, wherein:
the one or more audio feature outputs include one or more intermediate outputs of the audio feature neural network.

12. The computer-implemented method of claim 1, wherein the one or more audio feature outputs include:
a vector of probabilities, each probability indicating a likelihood that the audio data depicts a particular type of sound.

13. The computer-implemented method of claim 1, wherein the partitioning neural network is a recurrent neural network.

14. The computer-implemented method of claim 13, wherein the recurrent neural network is a bidirectional recurrent neural network.

15. The computer-implemented method of claim 1, wherein generating visual features for the particular shot includes one or more of:
generating color features characterizing the distribution of color intensities of the frames in the particular shot;
generating frame similarity features characterizing a similarity between different frames in the particular shot;
generating identity features based at least in part on one or more of:
identities of people depicted in the particular shot;
spatial positions of identified people depicted in the particular shot within video frames of the particular shot.

16. The computer-implemented method of claim 1, wherein:
providing the audio-visual feature representations of the shots as input to a partitioning neural network that is configured to process the audio-visual feature representations of the shots to generate a partitioning neural network output comprises:
providing the audio-visual feature representations of each shot of each shot window to the partitioning neural network, wherein a shot window is a sequence of a pre-determined number of shots, to generate a partitioning neural network output for each shot window; and determining the partition of the video into one or more chapters based on the partitioning neural network output comprises:
   combining the partitioning neural network output for each shot window.

17. One or more non-transitory computer storage media storing instructions that when executed by one or more computers cause the one or more computers to perform operations for determining a partition of a video into one or more chapters, the operations comprising:
   obtaining a partition of the video into one or more shots, wherein a shot is sequence of consecutive frames with a smoothly temporally varying viewpoint;
   generating an audio-visual feature representation of each shot, including, for each particular shot;
      generating visual features for the particular shot, including providing video data of the particular shot as input to a visual feature neural network that processes the video data to generate one or more visual feature outputs;
      generating audio features for the particular shot, including providing audio data of the particular shot as input to an audio feature neural network that processes the audio data to generate one or more audio feature outputs; and
      generating the audio-visual feature representation of the particular shot based on the visual features for the particular shot and the audio features for the particular shot;
   providing the audio-visual feature representations of the shots as input to a partitioning neural network that is configured to process the audio-visual feature representations of the shots to generate a partitioning neural network output that defines, for each shot, a probability that a last frame of the shot is a last frame of a chapter, wherein the probability corresponds to a numerical value between 0 and 1; and
   determining the partition of the video into one or more chapters based on the partitioning neural network output, wherein each chapter is a sequence of consecutive shots that are determined to be taken at one or more locations that are semantically related.

18. A system comprising:
   one or more computers; and
   one or more storage devices communicatively coupled to the one or more computers, wherein the one or more storage devices store instructions that, when executed by the one or more computers, cause the one or more computers to perform operations for determining a partition of a video into one or more chapters, the operations comprising:
      obtaining a partition of the video into one or more shots, wherein a shot is sequence of consecutive frames with a smoothly temporally varying viewpoint;
   generating an audio-visual feature representation of each shot, including, for each particular shot:
      generating visual features for the particular shot, including providing video data of the particular shot as input to a visual feature neural network that processes the video data to generate one or more visual feature outputs;
      generating audio features for the particular shot, including providing audio data of the particular shot as input to an audio feature neural network that processes the audio data to generate one or more audio feature outputs; and
      generating the audio-visual feature representation of the particular shot based on the visual features for the particular shot and the audio features for the particular shot;
   providing the audio-visual feature representations of the shots as input to a partitioning neural network that is configured to process the audio-visual feature representations of the shots to generate a partitioning neural network output that defines, for each shot, a probability that a last frame of the shot is a last frame of a chapter, wherein the probability corresponds to a numerical value between 0 and 1; and
   determining the partition of the video into one or more chapters based on the partitioning neural network output, wherein each chapter is a sequence of consecutive shots that are determined to be taken at one or more locations that are semantically related.

* * * * *